United States Patent [19]

Sigwald

[11] 4,148,287
[45] Apr. 10, 1979

[54] DEVICE FOR HEATING A CARBURETOR

[75] Inventor: Jacques Sigwald, Taverny, France

[73] Assignee: Automobiles Peugeot, Paris, France

[21] Appl. No.: 790,931

[22] Filed: Apr. 26, 1977

[30] Foreign Application Priority Data

Apr. 30, 1976 [FR] France .................... 76 12973

[51] Int. Cl.² .......................................... F02M 31/00
[52] U.S. Cl. ................................. 123/122 E; 123/133
[58] Field of Search ........... 123/122 AA, 122 H, 133;
261/144, 145; 165/51

[56] References Cited

U.S. PATENT DOCUMENTS

| | | | |
|---|---|---|---|
| 1,318,068 | 10/1919 | Giesler | 123/122 H |
| 3,762,385 | 10/1973 | Hollnagel | 261/144 |
| 3,780,714 | 12/1973 | Dillow | 261/144 |
| 3,986,486 | 10/1976 | Rabbiosi | 123/122 H |

FOREIGN PATENT DOCUMENTS

| | | | |
|---|---|---|---|
| 240619 | 12/1959 | Austria | 261/144 |
| 721276 | 4/1931 | France | 261/144 |
| 1100025 | 2/1954 | France | 123/122 H |

Primary Examiner—Ronald H. Lazarus
Attorney, Agent, or Firm—Burns, Doane, Swecker & Mathis

[57] ABSTRACT

The device comprises an auxiliary heating liquid circuit connected to the main cooling liquid cricuit of the engine on the suction side of the cooling circuit pump. The cooling circuit has an expansion chamber containing a gaseous phase. The heating circuit has a loop portion constituting a siphon whose upper point is located at a level above the level of the liquid in the expansion chamber. A pipe connects the loop portion to the upper part of the expansion chamber and is located throughout its path above the level of the liquid in the expansion chamber.

6 Claims, 2 Drawing Figures

U.S. Patent    Apr. 10, 1979    4,148,287
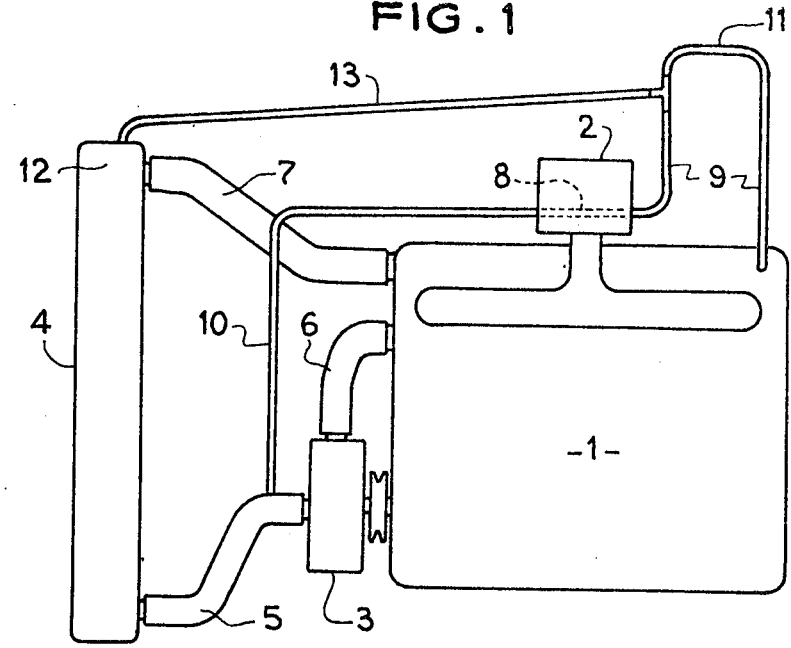
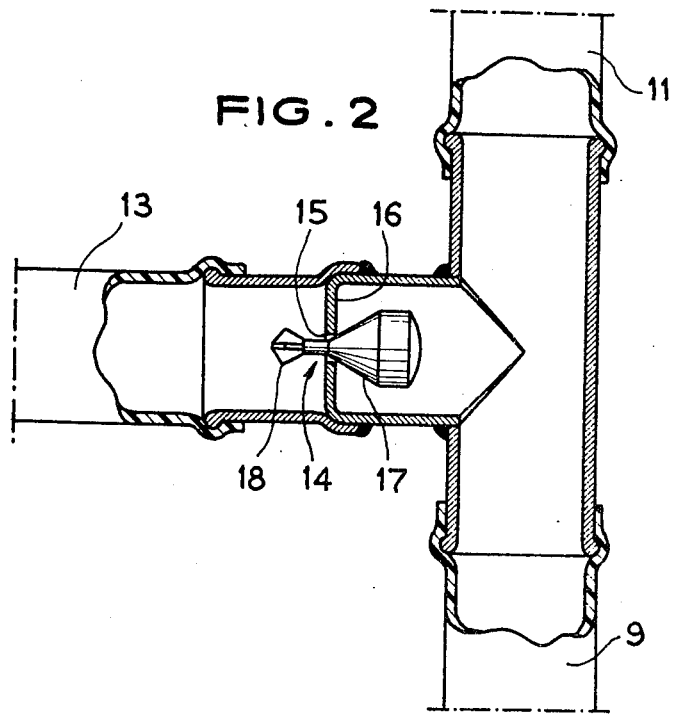

DEVICE FOR HEATING A CARBURETOR

The present invention relates to a device for heating a carburetor of an explosion engine and comprising a hot water circuit taken off from the cooling system.

The advantages resulting from these devices are known, which avoid the frosting of the carburetor at low temperatures and improve the vaporization of the petrol. On the other hand, these devices have the following drawbacks: after the stoppage of the engine a circulation of hot water may continue during a period of time in the region of the carburetor by a thermosiphon effect. The petrol contained in the vessel of the carburetor consequently evaporates and this pollutes the atmosphere.

An object of the invention is to improve such a device so as to avoid said drawback.

It therefore principally relates to a device for heating a carburetor associated with an explosion engine having an auxiliary circuit of liquid connected to the suction side of a pump which is part of a main cooling circuit of the engine which further comprises an expansion chamber having a gaseous phase.

It is characterized in that said auxiliary heating circuit has a loop portion forming a siphon the upper point of which is located at a level higher than that of the level of the liquid in the expansion chamber, said loop portion being connected to the upper part of the expansion chamber by a pipe which is located throughout its length above the level of the liquid contained in the expansion chamber.

According to another feature, there is provided in the path between said loop portion and the expansion chamber a valve which is closed under the effect of the pressure prevailing in the loop portion.

Another object of the invention is to provide an explosion engine provided with such a heating device.

One embodiment will be described in the ensuing description with reference to the accompanying drawing in which:

FIG. 1 is a diagrammatic view of a device according to the invention, and

FIG. 2 is an enlarged view of a detail of the device shown in FIG. 1.

FIG. 1 shows an explosion engine 1 supplied with fuel by a carburetor 2. The main cooling liquid circuit of the engine comprises, in particular, a pump 3 driven by the engine, a radiator 4, piping 5 connecting the base of the radiator to the suction side of the pump, piping 6 connecting the delivery side of the pump to the cylinder head of the engine 1 and piping 7 connecting the cylinder head of the engine 1 to the upper part of the radiator 4.

The auxiliary circuit for heating the carburetor comprises a heating pipe shown diagrammatically at 8 connected by a pipe 9 to the cylinder head of the engine 1 and by a pipe 10 to the suction side of the pump 3.

According to the invention, the pipe 9 forms a loop portion, the upper part 11 of which is located at a higher level than the top of the radiator 4 whose upper water box 12 constitutes an expansion chamber.

A pipe 13 connects the expansion chamber 12 of the radiator 4 to a point of the loop portion formed by the pipe 9 located at a level higher than the level of the liquid of the radiator 4. At the connection of the two pipes 13, 9 there is preferably disposed a valve 14 which is shown in detail in FIG. 2.

This valve is of known type and is disposed in an orifice 15 of a wall 16 disposed at the end of the pipe 13. It comprises a conical portion 17 adapted to obturate the orifice 15 when the liquid which flows in the pipe 9 is under pressure and a tail portion 18 which is adapted to retain the valve 14 when, after the pressure in the pipe 9 has disappeared, the weight of the conical portion 17 causes the valve member 14 to drop and partly open the orifice 15.

The operation of the device just described is very simple:

When the engine 1 rotates, the pump 3 maintains a pressure in the cooling circuit and in particular in the pipe 9. This pressure is sufficient to close the valve 14 and the carburetor is normally heated by the liquid passing through the pipe 8.

When the engine 1 is stopped, the pressure disappears in the pipe 9 and this causes the valve 14 to open. The gaseous mixture prevailing in the upper part of the radiator 4 then enters the pipe 9 whose upper part 11 is emptied of liquid. In this way, any circulation of hot water in the carburetor 2 is stopped in a definite manner.

Note that the presence of the valve 14 is not absolutely necessary for obtaining the desire result which would be obtained under the same conditions with a permanent leakage between pipe 9 and pipe 13. However, this solution would have the drawback of rendering the heating less effective mainly when starting up the engine.

Note also that the device would operate under the same conditions if the pipe 13 had a different configuration, for example with a high point, provided that it remains located, throughout its path, above the level of the liquid in the water box of the radiator 4.

Moreover, it will be obvious that if the cooling liquid is expanded in an expansion vessel or a gas-removing vessel independent of the radiator, the pipe 13 must be connected to the upper part of this vessel.

Having now described my invention what I claim as new and desire to secure by Letters Patent is:

1. A device comprising:
   an explosion engine having a carburetor, and a main cooling circuit including a liquid circulating pump and an expansion chamber containing a gaseous phase and a liquid phase;
   an auxiliary heating liquid circuit in heat exchange relationship to the carburetor, connected to the suction side of the circulating pump, and having a loop portion located above the liquid phase level in the expansion chamber; and
   pipe means located entirely above the liquid phase level in the expansion chamber, and connecting the loop portion to the expansion chamber at a position above the liquid phase level.

2. A device as claimed in claim 1 further including a valve in the auxiliary circuit between said loop portion and the expansion chamber, the valve closing under the effect of the pressure prevailing in the loop portion.

3. A device as claimed in claim 2, wherein the valve is placed adjacent a connection between the loop portion and said pipe means.

4. A device as claimed in claim 1, wherein the expansion chamber is disposed in the upper part of a radiator of the main cooling circuit.

5. An explosion engine having a carburetor, a carburetor heating device and a main cooling liquid circuit with a liquid circulating pump and an expansion chamber containing a gaseous phase and a liquid phase, the heating device comprising an auxiliary heating liquid circuit connected to the main cooling circuit on a suction side of the pump, including a loop portion constituting a siphon an upper point of which siphon is located at a level higher than the level of the liquid phase in the expansion chamber, and a pipe connecting the loop portion to an upper part of the expansion chamber, said pipe being located, throughout its path, above the level of the liquid phase in the expansion chamber.

6. The device of claim 1, wherein the pipe is connected with the loop portion such that a permanent leakage occurs therebetween.